(12) United States Patent
Goeltenboth et al.

(10) Patent No.: US 9,125,519 B2
(45) Date of Patent: Sep. 8, 2015

(54) COFFEE MAKER AND METHOD FOR OPERATING SAME

(71) Applicant: WMF Wuerttembergische Metallwarenfabrik AG, Geislingen/Steige (DE)

(72) Inventors: Frank Goeltenboth, Blaustein (DE); Gert Riethmueller, Geislingen (DE)

(73) Assignee: WMF Wuerttembergische Metallwarenfabrik AG (DE)

( * ) Notice: Subject to any disclaimer, the term of this patent is extended or adjusted under 35 U.S.C. 154(b) by 0 days.

(21) Appl. No.: 14/377,058

(22) PCT Filed: Jan. 9, 2013

(86) PCT No.: PCT/EP2013/050309
§ 371 (c)(1),
(2) Date: Aug. 6, 2014

(87) PCT Pub. No.: WO2013/117362
PCT Pub. Date: Aug. 15, 2013

(65) Prior Publication Data
US 2014/0356502 A1    Dec. 4, 2014

(30) Foreign Application Priority Data

Feb. 8, 2012 (CH) ...................... 0170/12

(51) Int. Cl.
*A47J 31/44* (2006.01)
*A47J 31/06* (2006.01)
*A47J 31/42* (2006.01)
*A23F 5/26* (2006.01)

(52) U.S. Cl.
CPC ............... *A47J 31/446* (2013.01); *A23F 5/262* (2013.01); *A47J 31/0663* (2013.01); *A47J 31/0689* (2013.01); *A47J 31/42* (2013.01)

(58) Field of Classification Search
CPC . A47J 31/446; A47J 31/0689; A47J 31/3609; A47J 31/4403; A23F 5/262
See application file for complete search history.

(56) References Cited

U.S. PATENT DOCUMENTS

| 2,755,733 | A | * | 7/1956 | Arosio et al. .................... 99/290 |
| 4,936,199 | A | * | 6/1990 | Ruggin et al. .............. 99/289 R |
| 5,237,911 | A | * | 8/1993 | Aebi ............................... 99/287 |
| 5,526,733 | A | | 6/1996 | Klawuhn et al. |
| 7,322,275 | B2 | | 1/2008 | Lussi |
| 2006/0254428 | A1 | * | 11/2006 | Glucksman et al. ......... 99/302 P |

(Continued)

FOREIGN PATENT DOCUMENTS

| CN | 201578093 | 9/2010 |
| EP | 0605750 | 7/1994 |

(Continued)

*Primary Examiner* — Anthony Weier
(74) *Attorney, Agent, or Firm* — Gerald E. Hespos; Michael J. Porco; Matthew T. Hespos

(57) ABSTRACT

A coffee maker (10) has at least one removable portafilter (11) that can be inserted into a holder (12) on the coffee machine to carry out brewing. The coffee maker has a hot water maker (28) for producing and dispensing hot water under pressure and at least one coffee mill (19). A filter element (33) is provided for repeated pressure-tight closing and opening of the portafilter (11) inserted into the holder (12) and a chute (23) is provided for introducing coffee powder (16) from the coffee mill (19) into the open portafilter (11) that has been inserted into the holder (12).

14 Claims, 6 Drawing Sheets

(56) References Cited

U.S. PATENT DOCUMENTS

2008/0190297 A1    8/2008   Gussmann et al.
2010/0080886 A1*   4/2010   Hourizadeh .................. 426/595
2011/0014340 A1*   1/2011   Spitzley et al. ............... 426/433
2011/0094391 A1    4/2011   Erba et al.
2011/0283889 A1    11/2011  Con et al.

FOREIGN PATENT DOCUMENTS

FR    2142885     2/1973
WO    9320736     10/1993
WO    02051290    7/2002

* cited by examiner

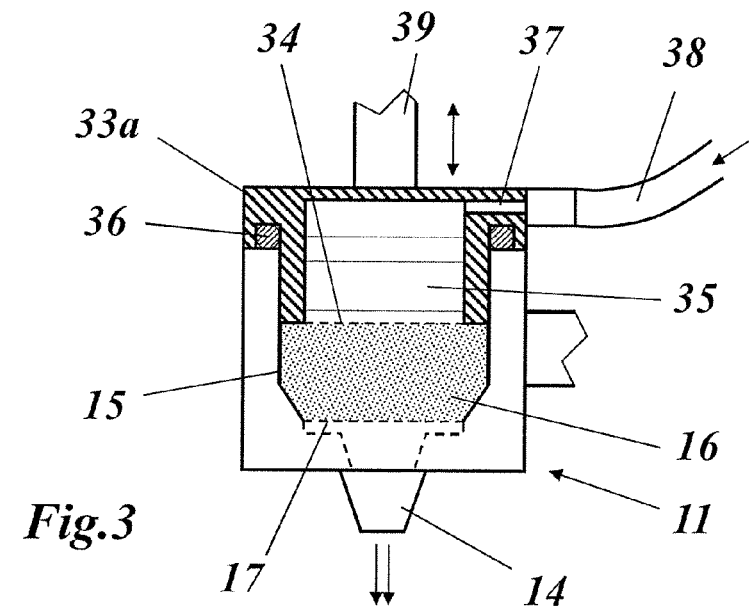
Fig.3
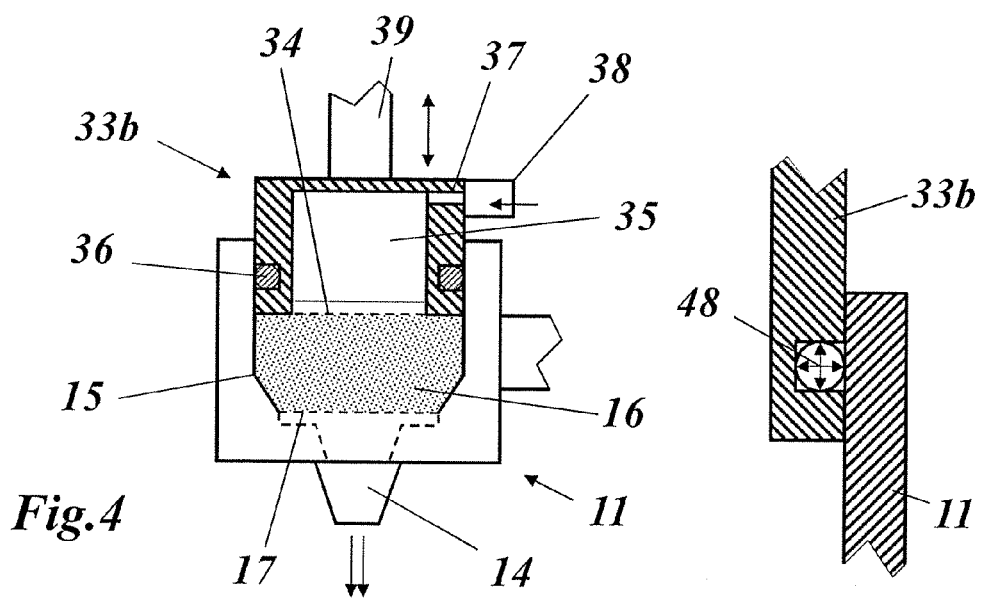
Fig.4
Fig.4a

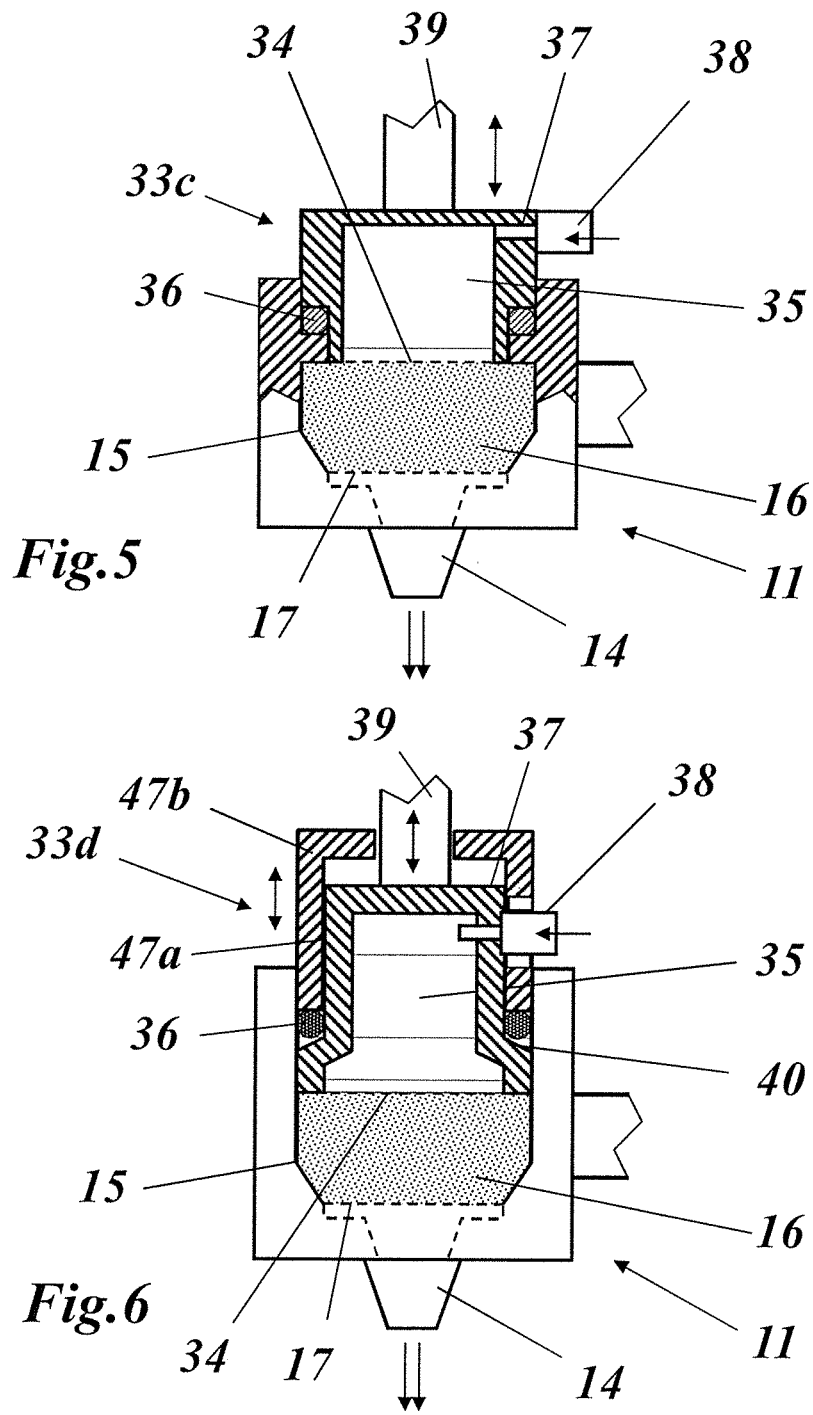

COFFEE MAKER AND METHOD FOR OPERATING SAME

BACKGROUND OF THE INVENTION

1. Field of the Invention

The invention relates to the field of coffee makers and to a method for operating such a coffee maker.

2. Description of the Related Art

Substantially two types of coffee makers can be found on the market. The first includes so-called "semi-automatic machines" or "portafilter machines", in the case of which the coffee powder is metered from a mill located next to the coffee maker into a portafilter (brewing pan comprising brewing filter and outlet opening), which is then clamped to the coffee maker (see, e.g., publication EP 2 314 188 A1). The brewing chamber is thereby sealed to the top in a pressure-tight manner by means of a distribution filter, which is fixedly installed in the coffee maker. The coffee maker subsequently meters hot water under pressure through this portafilter, which then dispenses the brewed coffee directly into the cup. The coffee quality is controlled substantially by the operator, namely by setting the grinding degree at the provided mill and by means of the force exerted in response to the so-called "tampering" (the compacting of the material to be ground in the portafilter). Under ideal conditions, the brewing result—aroma and crema—is of unbeatable quality. Many consumers associate ideal coffee quality with this design of a coffee maker. However, this design requires trained personnel, who are proficient in setting the grinding degree and the tampering—highly fluctuating coffee qualities are to be expected otherwise. The portafilter machines can be produced in a somewhat cost-efficient manner, because they are of low technical complexity.

The second type of coffee maker includes "fully-automatic machines" that are equipped with plunger brewers and built-in mills (see, e.g., EP 1955 624 A1 or EP 0 605 750 A1 or WO 03/043470). The built-in mill meters the coffee powder into a plunger-cylinder arrangement, which, on principle, consists of a cylinder, an upper and a lower plunger (the plungers, however, in each case encompass filter surfaces, which serve as (lower) brewing or (upper) distribution filter, respectively). The cylinder is subsequently closed by means of the plungers and hot water flows across the filters through the coffee, through a discharge tube across an outlet into the cup. The coffee quality of such machines is not as good as in the case of a semi-automatic machine, even with ideal design and with ideal setting conditions. The main cause for this is that the automatic plunger-cylinder arrangement is sensitive with regard to the very fine grinding degree settings, because, due to the friction ratio, the contact pressure of the plunger cannot be controlled as finely as it is possible manually in the case of the semi-automatic machine. On principle, a line and outlet system, which partially destroys the produced crema again and which cools-down the coffee, follows downstream from the brewing device. However, the coffee quality, which is attained, is very stable due to the fully-automatic production and the control of the process parameters and hardly differs from cup to cup, the quality is not dependent on the operator. Devices of this type are significantly more expensive as compared to semi-automatic machines, because the brewing device is a relatively complex structure.

However, coffee makers that are equipped with portafilters and that encompass a built-in mill, are also available on the market (see, e.g., publication WO 2010/085850 A1). For filling purposes, the portafilter is held therein underneath a separate mill discharge and is inserted into the brewing position as described in the case of the semi-automatic machine.

A generic coffee machine is known from CN 201578093 U.

It is thus an object of the invention to create a coffee maker, which combines the advantages of both designs, namely the simplicity and the high possible coffee quality of the semi-automatic machine and the stability of the result of a fully-automatic machine. If possible, the amount of work for the operator is to also be reduced as compared to that of the semi-automatic machine.

It is furthermore an object of the invention to specify a method for operating such a coffee maker.

SUMMARY OF THE INVENTION

The coffee maker according to the invention comprises at least one removable portafilter, which, in order to carry out brewing, can be inserted into a holder on the coffee maker provided for this purpose, first means for producing and dispensing hot water under pressure, and at least one coffee mill. It is characterized in that provision is made for second means for repeated pressure-tight closing and opening of the portafilter inserted into the holder and, if applicable, for tampering of coffee powder located in the portafilter, and in that provision is made for third means for introducing coffee powder from the coffee mill into the open portafilter, which is inserted into the holder.

The coffee maker, like the semi-automatic machine, is thus equipped with a removable portafilter. At the same time, however, the device is also equipped with a built-in mill, which loads the installed portafilter—similar to the fully-automatic machine—with coffee powder from the top within the machine. The portafilter is subsequently closed within the machine (e.g. with a lid or with a plunger), the coffee powder located in the portafilter is compressed (tampered) and brewing takes place in the same manner as in the semi-automatic machine. The emptying of the portafilter then takes place manually again. An extensive mechanism for automatically ejecting and collecting the used coffee powder (coffee grounds) can be foregone, without significantly increasing the operating effort. Instead, the periodic emptying and cleaning of a collection container for the coffee grounds is not necessary. The second means comprise a distribution filter element, which can be moved back and forth between a first position, in which the portafilter is open and can be filled with coffee powder, and a second position, in which the distribution filter element closes the portafilter in a pressure-tight manner. To move the distribution filter element between the first and second position an electrically or hydraulically operating drive unit is provided.

One embodiment of the coffee maker according to the invention is characterized in that the second means are embodied constructively for introducing the pressurized hot water into the portafilter, which is inserted into the holder. A particularly compact design of the brewing device can be attained through this.

Another embodiment of the coffee maker according to the invention is characterized in that the second means are provided for tampering coffee powder located in the portafilter.

In particular, the second means comprise a distribution filter element, which limits a brewing chamber by means of a distribution filter within the portafilter and introduces the pressurized hot water into the brewing chamber through the distribution filter.

In this context, it is possible for the distribution filter element to close the portafilter in the manner of a lid and for an axially acting seal to be provided between distribution filter element and portafilter.

However, it is also possible for the portafilter to encompass a cylindrical brewing chamber, for the distribution filter element to close the portafilter so as to plunge in the manner of a plunger and for a radially acting seal to be provided between distribution filter element and portafilter. The seal can thereby be inflated after the distribution filter element or plunger, respectively, have plunged, so as to attain or increase, respectively, the sealing effect. However, the seal can also be squeezed in radial direction so as to form a seal by axial compression. It is also possible to deflect the seal in radial direction by means of a cone surface (cone section), which can be displaced in axial direction.

A further embodiment of the coffee maker according to the invention is characterized in that the first means comprise a boiler, which is equipped with a heating device and which is hydraulically connected to the second means.

In particular, the boiler for generating the brewing pressure can be connected to a cold water connection via a pump. By feeding in cold water, the hot water is then pressed out of the boiler through the coffee powder in the portafilter at the required pressure by means of the pump.

A further embodiment of the coffee maker according to the invention is characterized in that provision is made for a central controller, which controls the coffee mill, the first means and, if applicable, the second means. The process of the beverage preparation can be controlled automatically by means of the controller, so as to attain a consistent result in accordance with the specified or specifiable parameters.

The method according to the invention for operating the coffee maker according to the invention comprises the following steps:

inserting an empty portafilter into the holder of the coffee maker provided for this purpose;
grinding a portion of coffee beans and filling the created coffee powder into the portafilter;
pressure-tight closing of the portafilter by means of the second means;
pressing hot water through the coffee powder enclosed in the portafilter;
removing and emptying the portafilter.

One embodiment of the method according to the invention is characterized in that the coffee powder located in the portafilter is tampered prior to or with the pressure-tight closing of the portafilter.

Another embodiment of the method according to the invention is characterized in that the hot water is pressed through by means of a plunger, which is arranged in the second means.

As an alternative to this, the hot water can be pressed through by means of a pump.

Another embodiment of the method is characterized in that the steps between the insertion of an empty portafilter and the removal and emptying of the portafilter are carried out automatically by means of a controller.

BRIEF EXPLANATION OF THE FIGURES

The invention will be explained in more detail below by means of exemplary embodiments in context with the drawing.

FIG. 3 shows the portafilter from FIG. 1, which is closed by means of a distribution filter element in the manner of a lid comprising an axially acting seal, in an enlarged detailed view.

FIG. 4 shows the portafilter from FIG. 1, which is closed by means of a distribution filter element in the manner of a plunger comprising a radially acting seal, in an enlarged detailed view.

FIG. 4a shows a radially acting seal for the distribution filter element from FIG. 4, which is inflated after moving the plunger into the portafilter, in an enlarged section.

FIG. 5 shows the portafilter from FIG. 1, which is closed by means of a distribution filter element, wherein the seal is stretched in radial direction by means of axial forces, in an enlarged detailed view.

FIG. 6 shows the closing by means of a distribution filter element, wherein the seal is pressed outwards in radial direction through a conical surface (cone section) located on the inside, in an illustration, which can be compared to FIG. 5.

DETAILED DESCRIPTION OF THE PREFERRED EMBODIMENT

The subject matter of the instant invention is a coffee maker, which, like the semi-automatic machine, is equipped with a removable portafilter. At the same time, however, the device is equipped with a built-in mill, which loads the installed portafilter—similar to the fully-automatic machine—with coffee powder from the top within the machine. The portafilter is subsequently closed within the machine by means of a lid or by means of a plunger and brewing takes place in the same manner as in the semi-automatic machine. The emptying of the portafilter takes place manually. According to its function, the coffee maker thus assumes a center position between a semi-automatic machine and a fully-automatic machine and establishes a new class of coffee makers, which can be identified as ¾ machines.

Figure 1:
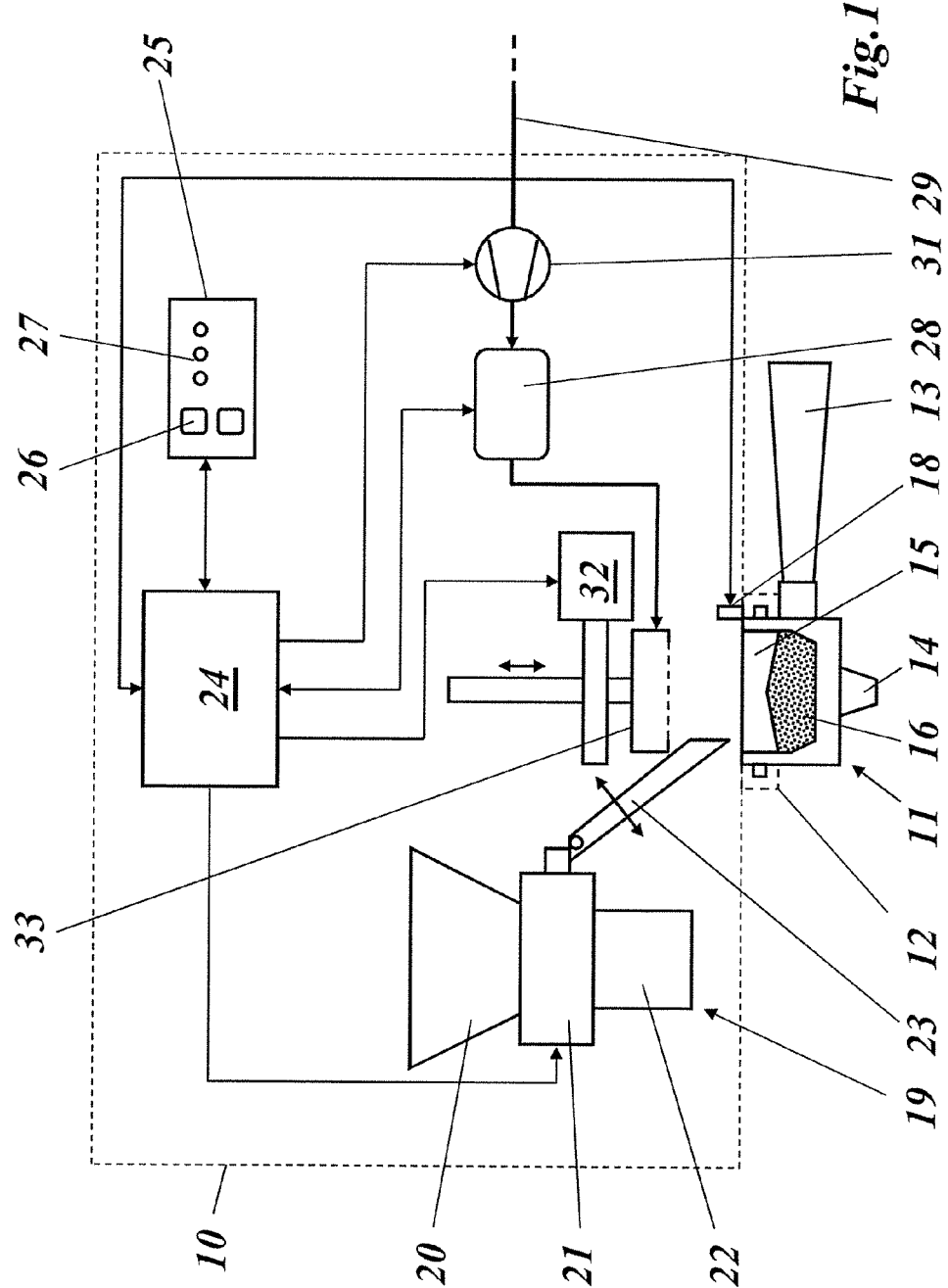
FIG. 1 shows a highly simplified diagram of a coffee maker according to an exemplary embodiment of the invention comprising an inserted portafilter prior to closing the portafilter.

FIG. 1 illustrates a highly simplified diagram of a coffee machine according to an exemplary embodiment of the invention comprising an inserted portafilter prior to closing the portafilter. In the lower area, the coffee maker 10, the outlines of which are only suggested by means of a dashed triangle, encompasses a holder 12 (also only suggested in a dashed manner), into which a portafilter 11 can be inserted so as to be capable of being removed.

The portafilter 11, which is inserted into the holder 12 in FIG. 1, has a brewing chamber 15, which is open to the top and which is substantially cylindrical, which—as is shown in FIGS. 3-6—is defined towards the bottom in a manner, which is known per se, by means of a brewing filter 17, which is adjoined by an outlet comprising an outlet opening 14 towards the bottom. On the outer side, the portafilter 11 has devices, which interact with the holder 12 and which make it possible for the portafilter 11 to be inserted into the holder 12, e.g. in the manner of a bayonet closure, and can be held there.

For easier handling, the portafilter 11 is equipped with a laterally projecting handle 13 in a manner, which is known per se.

A portafilter lock 18, which, in the activated state, makes it impossible for the portafilter 11 to be removed from the holder 12 and which is deactivated (released), when the brewing process has ended and the portafilter 11 is open again within the interior of the machine, can additionally be attached to the holder 12. However, instead of or in addition to the portafilter lock 18, it is also possible to provide for an optical display, which displays, when the portafilter 11 is open again and is thus ready to be removed.

A coffee mill 19, which, for example, encompasses a (funnel-shaped) bean container 20 for the coffee beans, which is arranged directly above a grinder 21, which is driven by a drive motor 22, is integrated in the interior of the coffee maker 10. The ground coffee powder 16 escapes laterally from the grinder 21 (in FIG. 1 on the right) and is conveyed into the portafilter 11, which is inserted into the holding 12 and which is still open, via a chute 23 in a particularly simple manner (by means of the force of gravity) in the illustrated example. The chute can be embodied so as to be pivotable, so as to securely convey the coffee powder 16 into the portafilter 11 in one position, and to provide for the unhindered closing of the portafilter 11 in another position, which is pivoted back (see FIG. 2). However, other mechanisms for conveying the coffee powder 16 are also possible.

Figure 2:
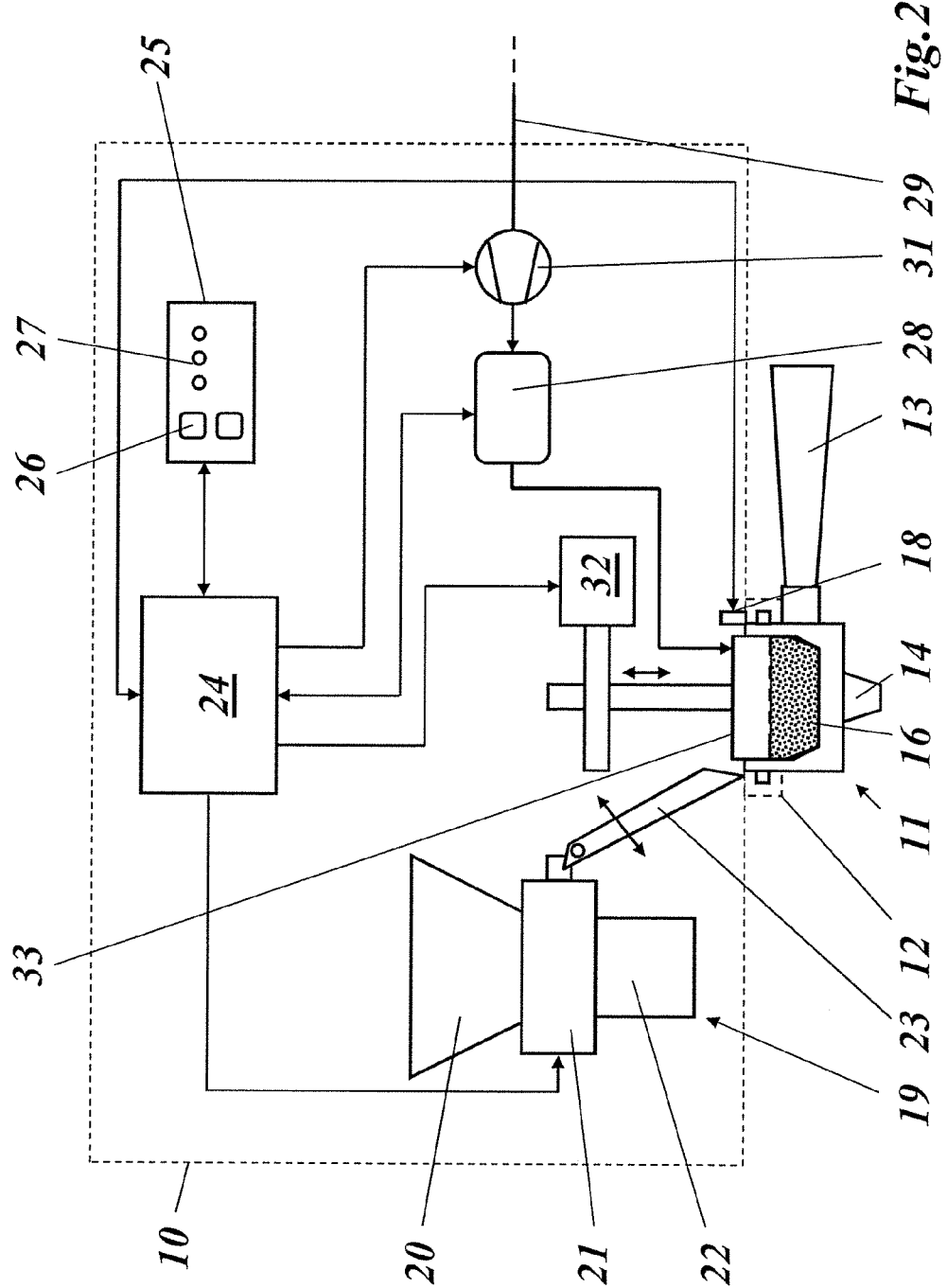
FIG. 2 shows the coffee maker from FIG. 1 after closing the portafilter.

In the example of FIG. 1, a distribution filter element in the manner of a plunger, which can be displaced in vertical direction by the drive unit 32 between the retracted position illustrated in FIG. 1 and the closed position illustrated in FIG. 2, is arranged directly above the portafilter 11, which is inserted into the holder 12. In the closed position, the distribution filter element 33 closes the brewing chamber 15 in the inserted portafilter 11, seals ("tampers") the coffee powder 16, which is initially present in the portafilter 11 in loose form, and provides for the supply of pressurized water via a distribution filter (34 in FIGS. 3-6), which is arranged on the bottom side of the distribution filter element 33. For this purpose, a distribution chamber 35, into which hot water can be introduced via an inlet borehole 37 from a hot water connection 38 from a boiler 28, which is installed in the machine, is located above the distribution filter 34 in the distribution filter element 33.

In the example of FIGS. 1 and 2, the boiler (hot water maker) 28 is hydraulically connected to the distribution filter element 33 and is connected to a cold water connection 29 via a pump 31. The water located in the boiler 28 is heated by means of an installed heating device (not illustrated in the figure) (e.g. a resistance heating) and is then conveyed under pressure (brewing pressure) into the distribution filter element 33 during the brewing process, where it enters into the brewing chamber 15 through the distribution filter 34 so as to be evenly distributed across the surface, flows through the coffee powder located there, and escapes again downwards through the brewing filter 17 and is dispensed to the outside via the outlet opening 14. The required brewing pressure is generated by pumping in cold water by means of the pump 31. The hot water outlet of the boiler 28 is thereby preferably connected via a flexible hose to the distribution filter element 33, so as to provide for the required freedom of movement of the latter in vertical direction. It goes without saying that, instead of using the boiler 28, it is also possible in this context to use a continuous-flow water heater, which heats up the water directly on the way to the distribution filter element 33.

So that the entire brewing process including the preparation of the coffee powder can run automatically and under constant conditions after inserting the portafilter 11, provision is made in the coffee maker 10 for a central controller 24, which is connected to a display/operating unit 25. The display/operating unit 25 encompasses buttons 26, which can be provided, for example for starting and stopping the brewing process and/or for inputting parameters (water quantity, cup size, beverage type, etc.) and/or for controlling optical displays. Provision can furthermore be made for optical displays in the form of signal lamps and/or alphanumeric displays, which provide information about the status of the machine, serve operator guidance and/or display operating values (number of dispensed cups, etc.) stored in a memory of the controller 24. It goes without saying that individual brewing programs can also be input via the display/operating unit 25, can be stored in the memory of the controller 24 and can be recalled, when required.

The controller 24 controls (and monitors) in particular the heating device in the boiler 28, the pump 31, the drive unit 32 of the distribution filter element 33, which operates in an electromotive or hydraulic manner, and the coffee mill 19. If a portafilter lock 18 is present, the same is also connected to the controller 24. A controlled drive is not necessary for pivoting the chute 23, if a mechanism is used to mechanically couple the chute 23 to the distribution filter element 33 or the drive unit 32, respectively, such that the chute 23 simultaneously pivots away to the outside when the distribution filter element 33 is moved downwards into the portafilter 11.

FIG. 2 shows the arrangement according to FIG. 1 after the distribution filter element 33 has plunged into the portafilter 11 and the simultaneous pivoting of the chute 23. The compacted (tampered) coffee powder 16 is located directly between the distribution filter 34 of the distribution filter element 33 and the brewing filter 17 of the portafilter 11. In this state, the pressurized hot water can be pressed through the coffee powder 16 via the distribution filter 34 and can be removed downwards via the brewing filter 17 at the outlet opening 14 of the portafilter 11 as coffee beverage.

So that the brewing process can run successfully, the brewing chamber 15, which is located between the filters 17 and 34, comprising the coffee grounds 16 located therein, must be closed in a pressure-tight manner to the outside. For this purpose, different possibilities are available, which will be explained below in context with FIGS. 3-6.

FIG. 3 shows the portafilter 11 from FIG. 1 in an enlarged detailed view. A distribution filter element 33a in the manner of a lid, which is equipped with an axially acting seal 36 and which, coming from the top, attaches to an upper ring-shaped front face of the portafilter 11 in the manner of a flange seal, so as to form a seal, is used to close the portafilter 11, which is filled with coffee powder 16. The basic design of the distribution filter element 33a can be such that, when attaching to form a seal, it simultaneously plunges with its distribution filter 34 into the portafilter 11 or the brewing chamber 15, respectively, and compresses the coffee powder 16 located in the brewing chamber 15 to a certain extent. The extent of compression thereby depends on the quantity of the coffee powder 16, which is filled in. If the quantity of the coffee powder 16 remains the same, the compression cannot be changed, because the end position of the distribution filter 34 is specified.

A certain flexibility in response to the tampering can be attained by means of seal configurations, as they are illustrated in FIG. 5 and FIG. 6. In the case of the distribution filter element 33c in FIG. 5, the seal 36 is compressed (squeezed) in axial direction and is thereby pressed against the lateral walls in radial direction so as to form a seal. Due to the yielding of the elastic seal, the distribution filter 34 can assume different end positions and can thus impact the coffee powder 16 to varying degrees.

In the case of the seal configuration according to FIG. 6, the distribution filter element 33d has a two-part design, comprising an inner part 47a, which surrounds a distribution chamber 35, comprising distribution filter 34, and an outer part 47b, which can be moved relative to the inner part 47a in closing direction. The inner part 47a tapers upwards by forming a cone section 40, on which a seal 36 rests on the outer side. The outer part 47b is pulled over the tapered section of the inner part 47a in a bell-like manner and its lower edge presses against the seal 36, when it is moved downwards relative to the inner part 47a. The seal 36 is thus spread so as to form a seal in response to the closing.

A significantly larger flexibility in response to the tampering can be attained by means of a configuration of the distribution filter element, as it is illustrated in FIG. 4. The distribution filter element 33b therein plunges into the portafilter 11 in response to the closing of the portafilter 11 in the manner of a freely displaceable plunger, wherein the sealing is attained by means of a radially acting seal 36. In this case, the coffee powder 16 can be compressed without geometric limitation, provided that the necessary forces are applied at the corresponding plunger rod 39. So as to attain a wear-free plunging of the plunger with a simultaneous large sealing effect in this case, a seal 48 can be used according to FIG. 4a, which is inflated only after assuming the end position of the plunger and which thus reaches its full sealing effect.

Figure 7:
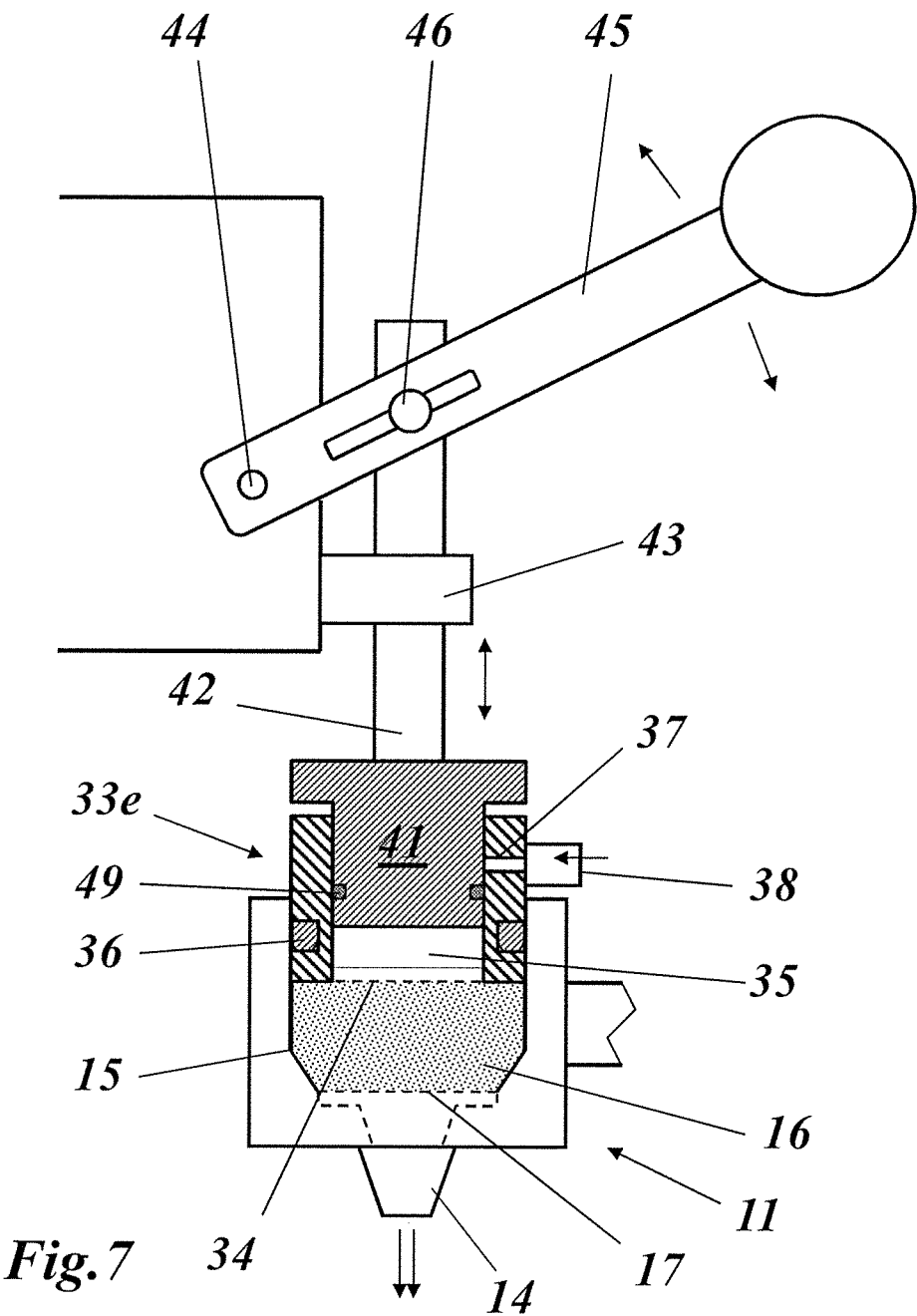
FIG. 7 shows the portafilter from FIG. 1, which is closed by means (not encompassed by the invention) of a manually-operated lever mechanism and to which pressurized hot water is applied by means of a manually-operated plunger, in an enlarged detailed view.

In the exemplary embodiment of FIGS. 1 and 2, provision is made for a drive unit 32, which operates in an electromotive or hydraulic manner, for displacing the distribution filter element 33 or 33a-d, respectively, between the two end positions. However, it is also possible to use a manually operated lever mechanism, which is not encompassed by the invention, for displacing the distribution filter element. One example for this is illustrated in FIG. 7. The distribution filter element 33e therein, in which a second plunger 41 is arranged additionally so as to be capable of being displaced, can be moved into the portafilter 11 so as to form a seal together with this plunger 41 via a plunger rod 42, which is guided in a guide 43—as in the example of FIG. 4. The plunger rod 42 can be moved upwards and downwards by pivoting the operating lever 45 in vertical direction via an operating lever 45, which is pivotably supported by means of a pivot bearing 44 and which is mechanically coupled to the plunger rod 42 via a hinge connection 46, wherein the force required for the tampering can be applied in response to the downwards movement.

The second plunger 41, which can slide in the distribution filter element 33e by means of a seal 49 so as to form a seal, makes it possible to press hot water under pressure through the distribution filter 34 into the brewing chamber by means of the operating lever 45. After filling in the coffee powder 16, the distribution filter element 33e is initially moved into the portafilter 11 in a manually-operated manner, so as to tamper the coffee powder 16. The second plunger 41 can thus be pulled out of the distribution filter element 33e to the extent that hot water can be introduced (without pressure) into the enlarged distribution chamber 35 via the inlet borehole 37. The introduced hot water can subsequently be pressed through the brewing chamber 15 and the coffee powder 16 located therein by inserting the second plunger 41 into the distribution filter element 33e. The mechanism can be simplified in this manner and the operator is able to select and vary the pressure applied in response to the tampering according to his own discretion.

Figure 8:
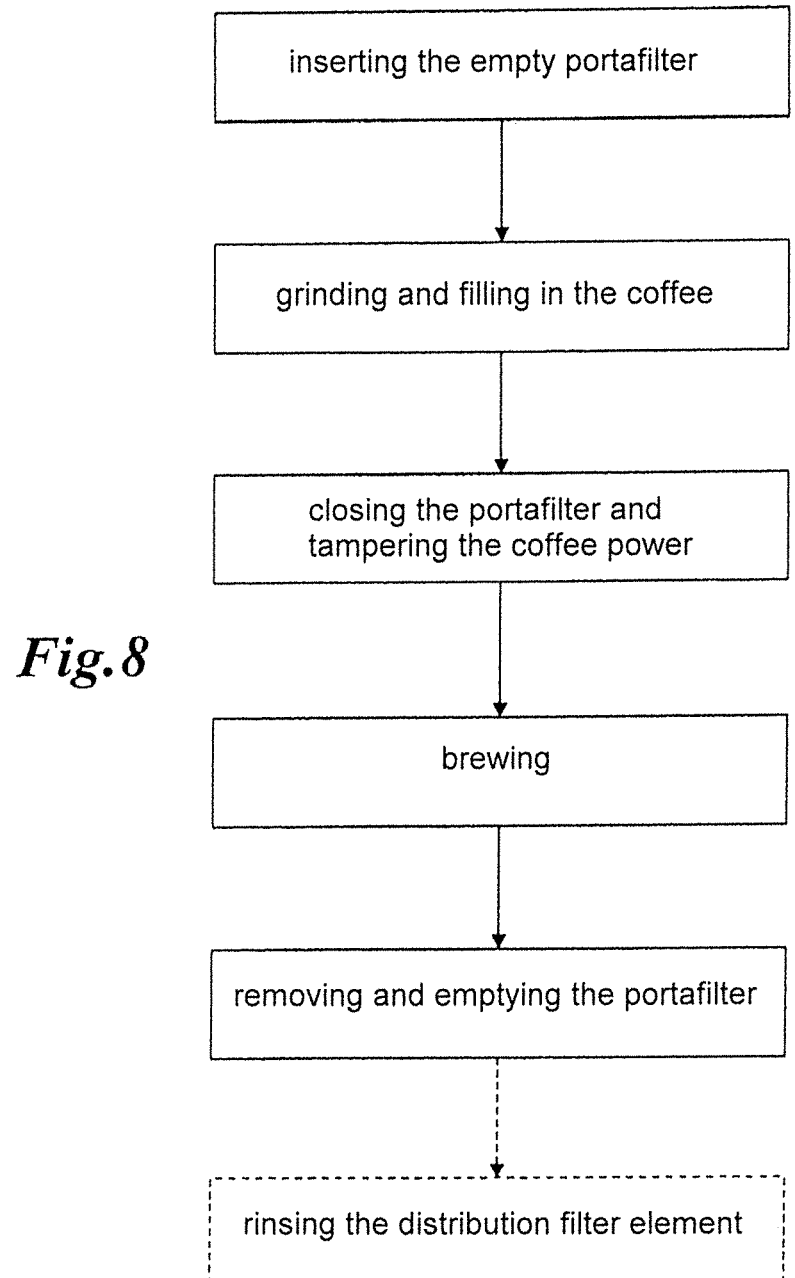
FIG. 8 shows an exemplary flow chart for the operation of a coffee maker according to the invention.

The entire process sequence is illustrated once again in FIG. 8 in its essential steps: the method starts with the insertion of the empty portafilter 11 into the holder 12 provided for this purpose on the coffee maker 10. After insertion, the required predetermined quantity of coffee is ground and is filled into the inserted portafilter. The portafilter 11 with the coffee powder 16 located therein is subsequently closed in a pressure-tight manner. This process can be accompanied by the tampering of the coffee powder. The actual brewing process is carried out subsequently, in that hot water is pressed through the coffee powder in the portafilter 11 under pressure. Once the brewing process has ended, the portafilter 11 can be removed from the holder 12 and can be emptied by tapping out the coffee grounds and can be cleaned, if necessary. In addition, provision can optionally be made for a machine-internal rinsing process for the distribution filter element, in which the distribution filter is freed from coffee powder residues, which might adhere.

In summary, a new coffee maker (¾ machine) is created with the invention, which is characterized by the following advantages:
- a specifiable, constant quality of the beverage is attained by an automation during grinding, filling in and tampering of the coffee, in response to the closing of the portafilter and in response to the brewing; only the non-critical emptying of the portafilter is taken over by the operator;
- by saving an ejection mechanism for the coffee grounds, the device-related effort for the coffee maker is reduced considerably;
- the cleaning of the machine is simplified considerably due to the removable portafilter;
- the laborious emptying of a collection container for the coffee grounds located in the machine is eliminated.

The invention claimed is:

1. A coffee maker for producing a beverage from at least coffee powder and water, the coffee maker comprising:
  a housing with a lower surface having at least one holder;
  a portafilter having a bottom wall, a side wall projecting rigidly up from the bottom wall and a brewing chamber of fixed volume inward of the side wall and above the bottom wall, an outlet opening formed in the bottom wall, the portafilter further having an outer surface with at least one device that releasably engages the holder for removably positioning the portafilter on the lower surface of the housing;
  a coffee mill disposed in the housing at a position for dispensing coffee powder to the brewing chamber when the portafilter is fitted in the holder;
  a distribution filter element movable between an open position in which the brewing chamber is open for receiving coffee powder from the coffee mill and a closed position in which the distribution filter element creates a pressure-tight seal on the brewing chamber;
  water-distributing means for distributing hot water under pressure into the distribution filter element; and
  an electrically or hydraulically operated drive unit for moving the distribution filter element between the open and closed positions.

2. The coffee maker of claim 1, wherein the distribution filter element is embodied constructively for introducing the pressurized hot water into the portafilter that is inserted into the holder.

3. The coffee maker of claim 2, wherein that the distribution filter element is provided for compacting the coffee power located in the portafilter.

4. The coffee maker of claim 2, wherein the distribution filter element includes a distribution filter within the portafilter and the pressurized hot water is distributed into into the brewing chamber through the distribution filter.

5. The coffee maker of claim 4, wherein the distribution filter element the portafilter in the manner of a lid, and in that an axially acting seal is provided between distribution filter element and portafilter.

6. The coffee maker of claim 4, wherein the distribution filter element closes the portafilter so as to plunge in the manner of a plunger and a radially acting seal is provided between distribution filter element and portafilter.

7. The coffee maker of claim 1, wherein the water distributing means comprises a boiler that is equipped with a heating device and that is hydraulically connected to the water distributing means.

8. The coffee maker of claim 7, wherein the boiler for generating the brewing pressure is connected to a cold water connection via a pump.

9. The coffee maker of claim 1, further comprising a central controller that controls the coffee mill, the water distributing means, and the distribution filter element.

10. A method for operating the coffee maker of claim 1, said method comprising the following steps:

a. inserting the portafilter into the holder of the coffee maker;
b. grinding a portion of coffee beans in the coffee mill and filling the created coffee powder into the portafilter;
c. pressure-tight closing of the portafilter by means of the distribution filter element;
d. pressing hot water through the coffee powder enclosed in the portafilter; and
e. removing and emptying the portafilter.

11. The method of claim 10, wherein the coffee powder located in the portafilter is compacted prior to or with the pressure-tight closing of the portafilter.

12. The method of claim 10, wherein the hot water is pressed through by a plunger arranged in the second means.

13. The method of claim 10, wherein the hot water is pressed through by a pump.

14. The method of claim 10, wherein the steps between the insertion of an empty portafilter and the removal and emptying of the portafilter are carried out automatically by a controller.

* * * * *